(12) United States Patent
Gipson

(10) Patent No.: US 7,182,163 B1
(45) Date of Patent: Feb. 27, 2007

(54) POSITIONING MECHANISM FOR A VEHICLE

(76) Inventor: Tommie Carroll Gipson, 19668 County Rd. 74, Eaton, CO (US) 80615

( * ) Notice: Subject to any disclaimer, the term of this patent is extended or adjusted under 35 U.S.C. 154(b) by 0 days.

(21) Appl. No.: 11/337,988

(22) Filed: Jan. 24, 2006

Related U.S. Application Data

(60) Provisional application No. 60/730,736, filed on Oct. 27, 2005.

(51) Int. Cl.
*B62D 51/06* (2006.01)
*B60S 9/02* (2006.01)

(52) U.S. Cl. .................. 180/8.1; 180/8.3; 180/8.5; 180/8.6; 280/763.1; 280/762; 280/766.1

(58) Field of Classification Search ............ 180/763.1, 180/762, 766.1, 8.1, 8.3, 8.5, 8.6, 199, 203
See application file for complete search history.

(56) References Cited

U.S. PATENT DOCUMENTS

| | | | | |
|---|---|---|---|---|
| 3,869,149 A | * | 3/1975 | Dixon | 280/475 |
| 3,933,372 A | * | 1/1976 | Herndon | 280/763.1 |
| 4,444,416 A | * | 4/1984 | Soderstrom | 280/763.1 |
| 4,708,362 A | * | 11/1987 | Raetz | 280/763.1 |
| 5,622,235 A | * | 4/1997 | Merritt | 180/9.42 |
| 6,079,510 A | * | 6/2000 | Miyamoto | 180/8.3 |
| 6,089,603 A | * | 7/2000 | Ackley | 280/765.1 |
| 6,092,975 A | * | 7/2000 | Cannon et al. | 414/563 |
| 6,481,749 B2 | * | 11/2002 | Ahlers et al. | 280/764.1 |
| 6,802,535 B1 | * | 10/2004 | Alguera Gallego et al. | 280/763.1 |
| 6,811,161 B1 | * | 11/2004 | Anderson | 280/4 |
| 7,073,821 B2 | * | 7/2006 | Lagsdin | 280/763.1 |

* cited by examiner

*Primary Examiner*—Lesley D. Morris
*Assistant Examiner*—Marlon Arce-Diaz
(74) *Attorney, Agent, or Firm*—Elizabeth R. Hall

(57) ABSTRACT

The invention contemplates a selectably operable hydraulic means for laterally shifting one end of a non-moving vehicle in order to provide a desired alignment. The present invention is particularly applicable to vehicle-mounted equipment which has an invariant lateral mounting position on the vehicle and which must be laterally aligned with a stationary workpiece axis. An example of such a need occurs with mobile workover rigs used in well maintenance.

20 Claims, 12 Drawing Sheets

POSITIONING MECHANISM FOR A VEHICLE

CROSS-REFERENCE TO RELATED APPLICATION

The present application, pursuant to 35 U.S.C. 111(b), claims the benefit of the earlier filing date of provisional application Ser. No. 60/730,736 filed Oct. 27, 2005, and entitled "Positioning Mechanism for Placement of a Rig."

BACKGROUND OF THE INVENTION

1. Field of the Invention

The field of the present invention is selectably operable hydraulic means for laterally shifting one end of a non-moving vehicle in order to provide a desired alignment. The present invention is particularly applicable to vehicle-mounted equipment which has an invariant lateral mounting position on the vehicle and which must be laterally aligned with a stationary workpiece axis.

2. Description of the Related Art

The use of vertically acting rigidly mounted corner cylinders, articulated arms, and the like are well known to those engaged in the art of vertically supporting vehicles mounting working equipment. Such vertical supports generally use either a screw jack or hydraulic cylinder to extend an approximately horizontal bearing plate downwardly to bear against the ground surface and thereby provide vertical support and alignment. However, while such devices are designed for providing adjustable corner vertical supports for vehicles, such devices previously have not offered any means to deal with lateral misalignment.

Accordingly, lateral alignment of the vehicle with its attendant alignment-sensitive equipment can only be achieved by repeatedly backing up and pulling forward. This procedure can be very time consuming because of the lack of ready visual feedback, since the equipment mounted on the vehicle usually obscures the field of vision of the driver. If the ground surface has soft spots and or ruts, the provision of proper alignment becomes even more difficult.

For example, truck or trailer-mounted conventional workover rigs are brought to a well location for workover operations. The driver attempts to back the workover rig so that it is centered over the wellhead. However, it can be very difficult to center the workover rig directly over the wellhead such that the driver has to pull forward and backward a number of times before the workover rig is centered over the wellhead.

A need exists for a simple, selectably operable means that can readily provide adjustments in lateral alignment for vehicles such as trucks and truck-trailer rigs. There is a need for a lateral shifting means which can be operated by one man and that does not add significant weight to the vehicle.

Furthermore, there is a need for a lateral shifting means that can be set up and retracted rapidly using rig hydraulics to facilitate proper equipment emplacement at a job site.

SUMMARY OF THE INVENTION

The invention contemplates a vehicular lateral shifting assembly having a selectably extensible hydraulic cylinder mounted on one end of a body of a vehicle, wherein the cylinder is pivotable in a plane transverse to a longitudinal axis of the vehicle, whereby when the cylinder is pivoted and extended the one end of the body of the vehicle is laterally shifted.

One aspect of the present invention is a vehicular lateral shifting assembly comprising: (a) a pair of selectably extensible hydraulic cylinders, wherein one cylinder is mounted on a first side of one end of a body of a vehicle and the other cylinder is mounted on a second opposed side of the one end of the body; (b) a mounting means for mounting a proximal end of each cylinder to the one end of the body; (c) a pivotable means for pivoting the cylinders in a plane transverse to a longitudinal axis of the vehicle; (d) a latching means for securing the cylinders in a designated position in the plane transverse to the longitudinal axis of the vehicle; and (e) a swivelable bearing plate mounted on a distal end of each cylinder.

Another aspect of the invention is a four-bar linkage vehicular lateral shifting assembly comprising a pair of selectably extensible parallel hydraulic cylinders and two interconnecting links.

Yet another aspect of the invention is a vehicular lateral shifting assembly comprising: (a) a pair of selectably extensible hydraulic cylinders, wherein one cylinder is mounted on a first side of one end of a body of a vehicle and the other cylinder is mounted on a second opposed side of the one end of the body; (b) a clevis mount for pivotably mounting a proximal end of each cylinder to the one end of the body; (c) a latching mechanism for securing each cylinder in one of a number of designated positions in the plane transverse to the longitudinal axis of the vehicle; and (d) a swivelable bearing plate mounted on a distal end of each cylinder.

Still yet another aspect of the present invention is a method for laterally shifting an end of a stationary vehicle having the vehicular lateral shifting assembly of claim 16, the method comprising the steps of: (a) selectably tilting the distal end of the hydraulic cylinders in an opposed direction to the direction in which lateral displacement is desired; (b) activating the latching mechanism to secure each tilted hydraulic cylinder into one of the designated positions; and (c) extending the hydraulic cylinders to urge the bearing plates against a supporting surface thereby laterally displacing the one end of the vehicular body in the desired direction.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The lateral rig shifter of the present invention provides a means of quickly, safely, and effectively producing a desired transverse alignment for the end of a vehicle on which a piece of working equipment is mounted. The lateral rig shifter employs a pair of conventional corner jacking cylinders that are conventionally used for rig vertical stabilization. However, by mounting them in a latchable transversely movable four-bar linkage, a single man can readily adjust the orientation of the jacking cylinders to not only support the rig vertically, but also to selectably realign the end of the vehicle to either side in a controllable manner.

The materials of construction of the vehicle frame and working deck are typically steel rolled sections and plate assembled by welding. Although it is not shown in all the Figures, the rear of the deck of the vehicle is assumed to mount an item of working equipment, such as a workover rig, which has a fixed vertical longitudinal plane in which it works and which is fixed against lateral movement by its mountings. The vehicle is normally supported at its rear by a sprung suspension system and one or more axles on which pneumatic tires are mounted. Where the vehicle is a trailer, as shown herein, a towing tractor will normally support the front end of the vehicle. The lateral shifting mechanism, which includes a pair of hydraulic cylinders, is generally fabricated from steel bars, tubes, and weldments utilizing rolled plate.

The lateral rig shifter of the present invention is operated by utilizing the hydraulic system of the vehicle-mounted equipment as a power supply. The details of the available hydraulic systems of the vehicle-mounted equipment vary considerably and so are not shown here. If single-acting spring-return hydraulic cylinders are used for the present invention, they are easily controlled by a manual two-position three-way valve connected to the piston end of the lift cylinders. Pressure is selectably applied to the rod end of the cylinders with the valve in one position, while the cylinders are vented to the tank of the hydraulic system with the valve its other position.

First Embodiment 10

Figure 1:
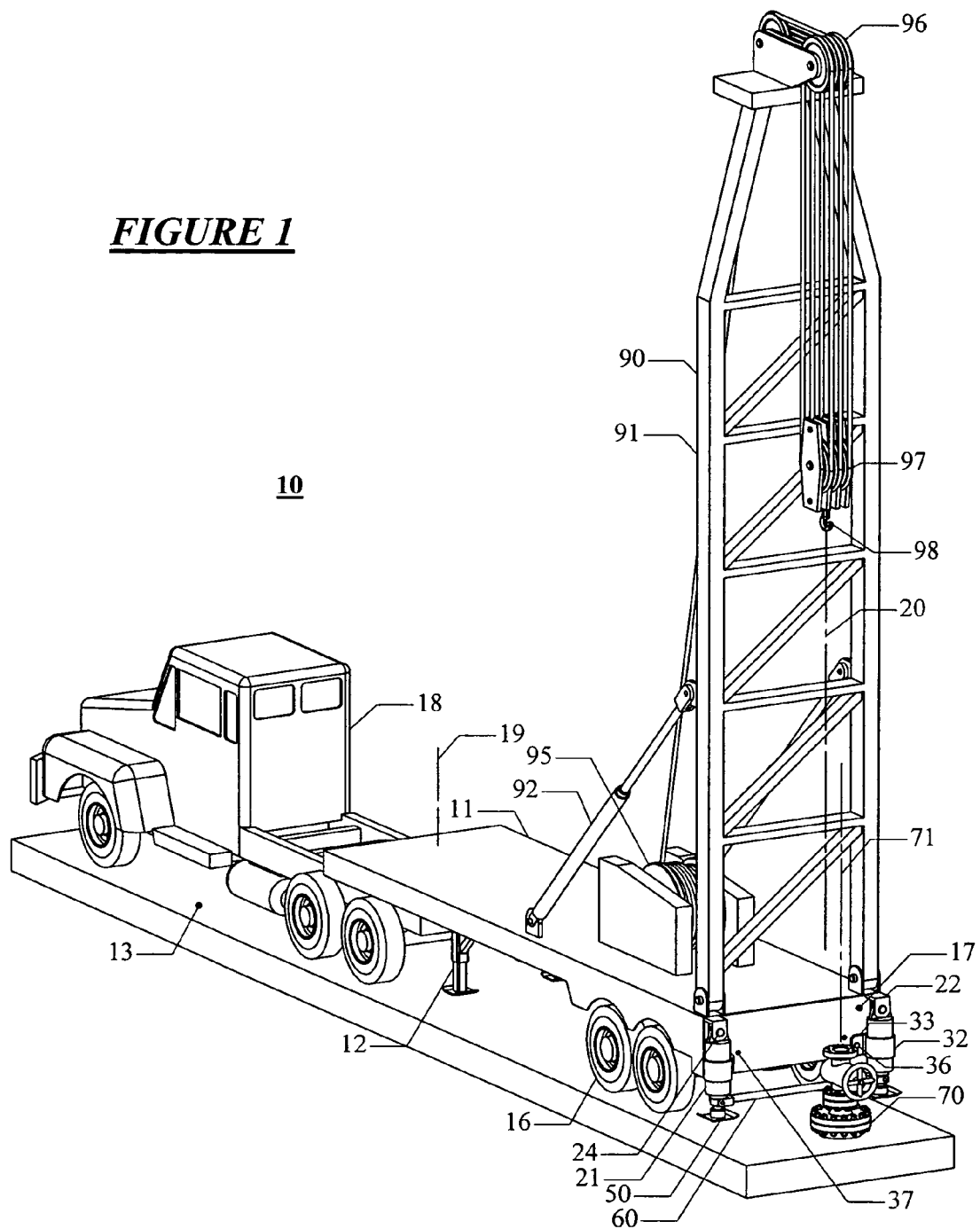
FIG. 1 is an oblique profile view of a semitrailer towed by a tractor rig with a workover rig positioned on the trailer, wherein one embodiment of the lateral shifting means is mounted at the rear of the vehicle.
Figure 2:
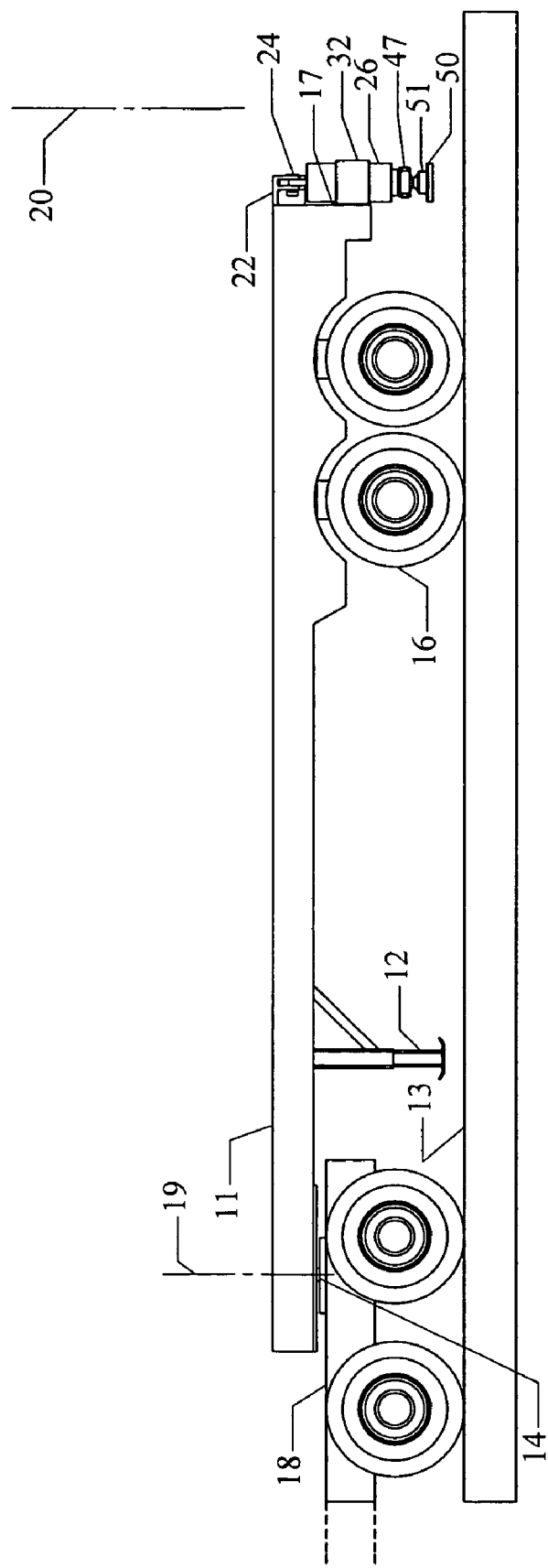
FIG. 2 is a side profile view of the embodiment of FIG. 1.

Referring now to the drawings, it is pointed out that like reference characters designate like or similar parts throughout the drawings. The Figures or drawings are not intended to be to scale. As seen in FIGS. 1 and 2, the first embodiment 10 of the present invention utilizes a semitrailer 11 as the vehicle upon which a piece of working equipment is generally mounted. Such working equipment, as for example a drilling rig or workover rig may be utilized for the boring and servicing of wells. In general, such equipment is mounted on the vehicle in a manner that does not permit the equipment to be laterally shifted on the vehicle to alter its alignment with a work site on the surface of the ground 13. The trailer 11 is towed to its working location by a tractor rig 18 and backed up to its desired location. Longitudinal alignment typically is easily managed when backing up to a work site, but lateral alignment is more difficult to obtain, particularly if a location has an irregular surface.

The trailer 11 typically has a working deck of steel plate supported by longitudinal and transverse beams and upon which is mounted working equipment having a vertical axis of operation 20 located on the longitudinal vertical centerline of the trailer and offset to the rear of the trailer. As seen in FIG. 1, a workover rig 90 consisting of a pivotable mast 91, mast elevating cylinders 92, a drawworks 95, a crown block 96, and a traveling block 97 is mounted at the rear of the trailer 11. The workover rig 90 requires that the vertical axis 20 for travel of its traveling block 97 and its attached hook 98 be aligned with the axis 71 of the wellhead 70. For clarity, only the axis of operation 20 is shown herein for the Figures following FIG. 1.

The trailer 11 is attached to a tractor rig 18 for transport and is normally left coupled to the tractor rig. However, for clarity in the Figures following FIG. 2, the trailer 11 is shown without its attached tractor rig 18. When decoupled from the tractor rig 18, the forward end of the trailer 11 may be supported on vertically extensible support legs 12 that bear on the ground surface 13. A vertically downwardly extending king pin 14, used to connect the trailer 11 to the fifth wheel of the tractor rig 18 for towing, is positioned on the longitudinal vertical midplane of the underside of the forward end of the trailer 11. The king pin 14 and the fifth wheel of the tractor rig 18 have a common vertical axis of rotation 19 when coupled as shown in FIGS. 1 and 2.

Figure 4:
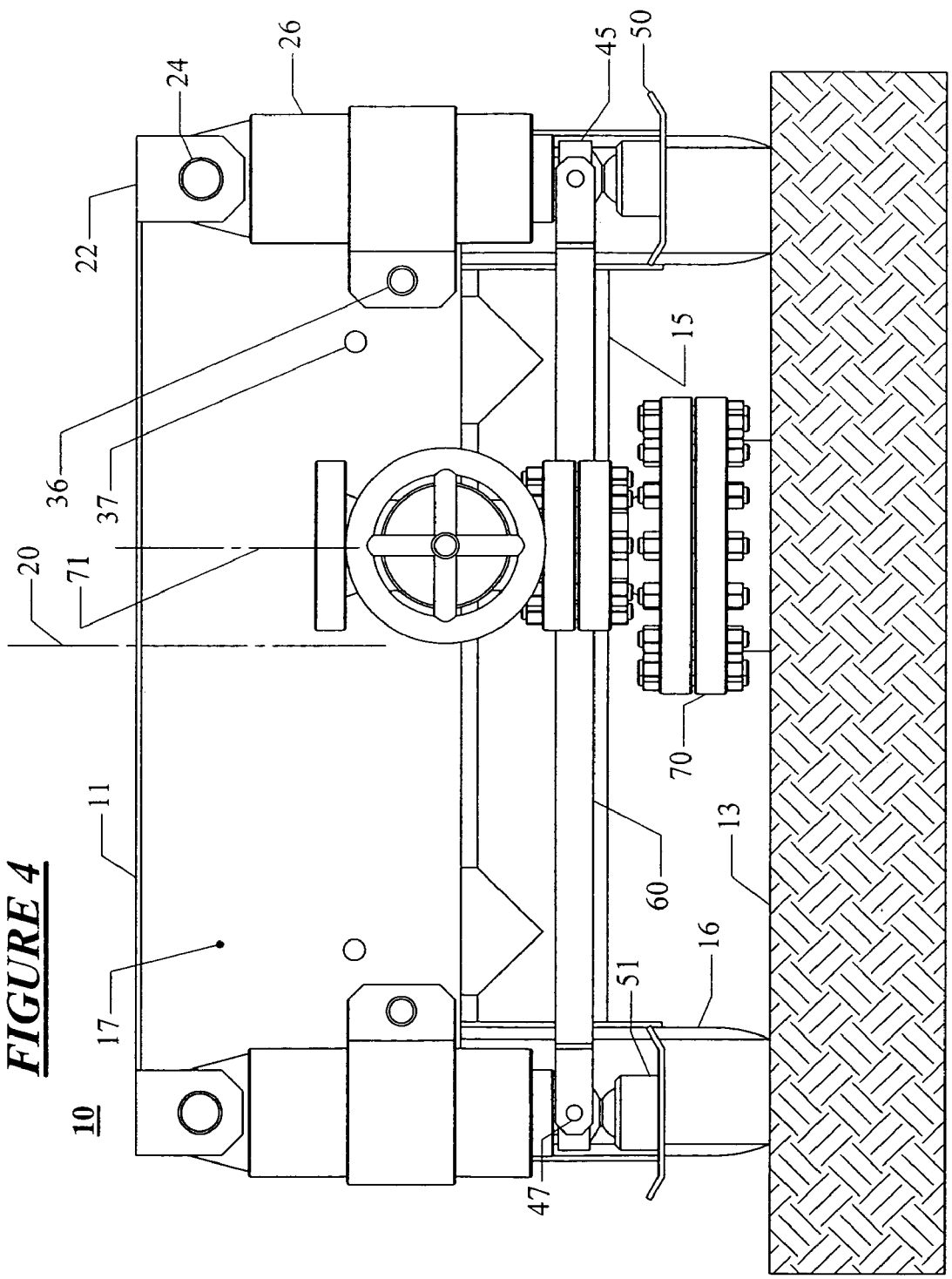
FIG. 4 is a rear profile view of the vehicle and the first embodiment of the lateral shifting means, wherein the shifting means is retracted in its traveling position and the rear of the vehicle is laterally displaced from a wellhead upon which work is to be performed using vehicle-mounted equipment.

As shown in FIGS. 1, 2, and 4, the rear of the trailer 11 is supported by a conventional sprung suspension mounting one or more rear axle assemblies 15 which in turn mount pneumatic tires 16 which support the trailer during travel and setup or when parked.

Figure 3:
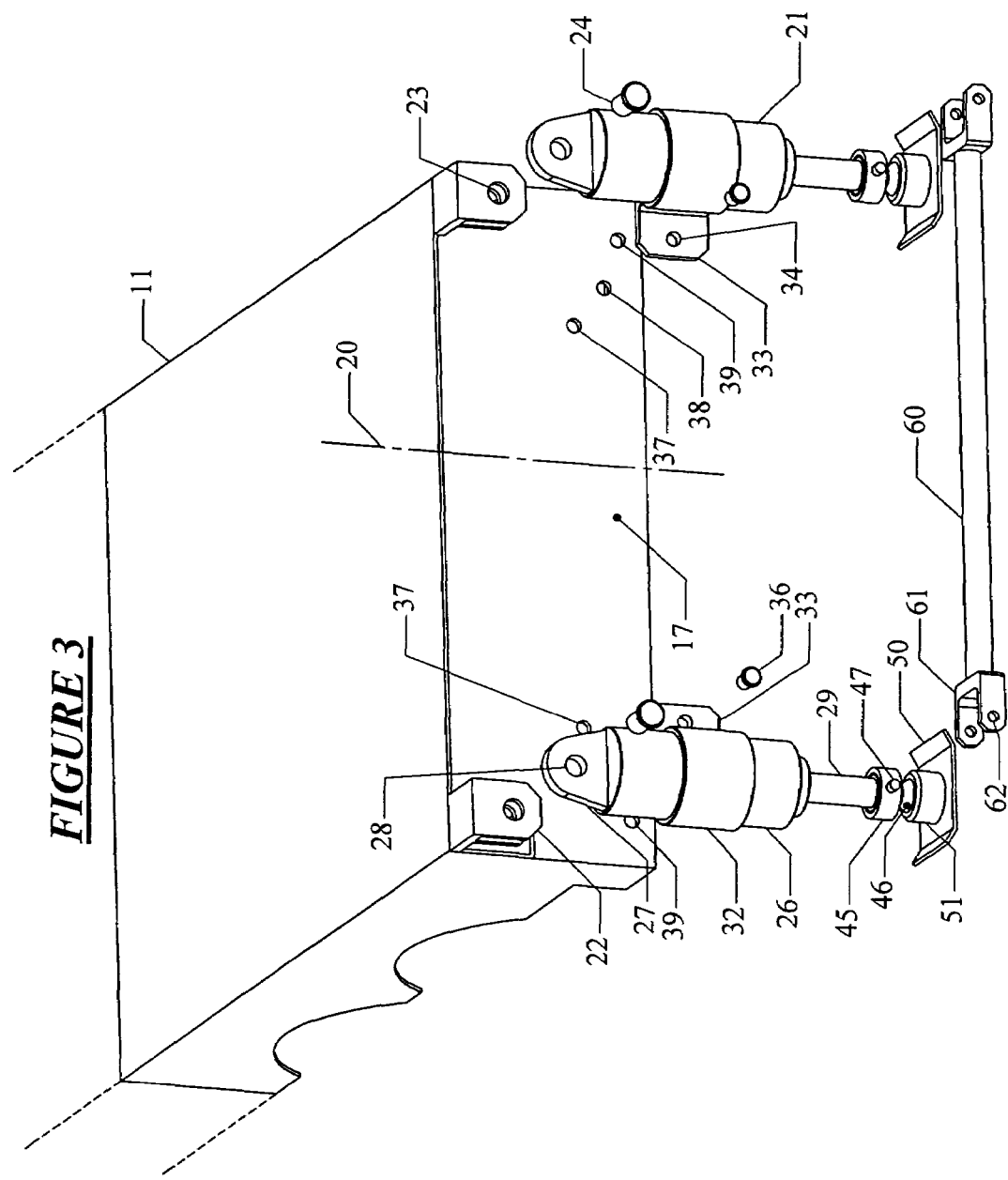
FIG. 3 is an oblique view of the rear of the lateral shifting means shown in FIG. 1, wherein the lateral shifting means mechanism is shown in an exploded state.

As seen best in FIG. 3, at the rear of the trailer 11, a reinforced plate transverse rear bulkhead 17 serves as a mounting for the lateral shifting assembly 21. Bulkhead 17 is penetrated by two similar sets of latch pin holes. Although any number or shape of latch pin holes can make up a set, the example described herein uses a set of three pin holes 37, 38, and 39. The two pin hole sets are symmetrically placed about the longitudinal vertical axis of the trailer and all of the pin holes are parallel to the longitudinal horizontal axis of the trailer 11. Typically, each set of latch pin holes 37, 38, and 39 is located on a common circular arc and at uniform angular spacings.

On each side of the lateral shifting assembly 21 is a pair of lift cylinder brackets 22 with each cylinder bracket 22 mounting a lift cylinder 26 with a swivelable bearing foot 50 on the outer end of the cylinder rod 29. The two lift cylinders 26 are interconnected with a tie bar 60. The lateral shifting assembly 21 is mounted to the transverse rear bulkhead 17 of the trailer 11 and is contained in a plane that is transverse to the trailer horizontal longitudinal axis. The plane of the lateral shifting assembly 21 is forward of the vertical axis 20 of the trailer mounted equipment, and is slightly offset to the rear from the bulkhead 17.

The downwardly opening clevis-type lift cylinder brackets 22 are mounted at the outer upper corners of the rear face of bulkhead 17. Each cylinder bracket 22 has a swivel pin hole 23 extending coaxially through both of its clevis plates, with the swivel pin holes parallel to the horizontal longitudinal axis of the trailer 11. A main cylinder pivot pin 24 of headed right circular cylindrical construction is mounted in each swivel pin hole 23, where it serves to support the piston end of a lift cylinder 26. The lift cylinders 26 are preferably single-acting spring-return hydraulic cylinders with single end piston rods 29 projecting generally downwardly through rod glands on their lower ends and having end swivel plates 27 at their upper ends. The distal ends of the piston rods 29 are helically threaded. Each symmetrically positioned end swivel plate 27 is penetrated by a centrally located right circular cylindrical cylinder swivel pin hole 28 which has a rotational fit with the main cylinder pivot pin 24 in the bracket 22 on its side of the bulkhead 17. This arrangement permits each cylinder to pivot about the swivel pin hole 28 at its upper end and in the transverse plane of the lateral shifting assembly 21.

At an intermediate position in the length of each cylindrical cylinder body below midlength is positioned a latching sleeve 32. The latching sleeve 32 is a right circular cylindrical sleeve fixed to the body of the lift cylinder 26 and having an integral, tangentially projecting latch plate 33 extending generally toward the middle horizontal axis of the trailer 11. The latch plates 33 are parallel to but offset to the forward side of the end swivel plates 27 so that they are coplanar and are in sliding contact with the transverse rear bulkhead 17 of the trailer 11. Each latch plate 33 is penetrated by a centrally located right circular cylindrical latch pin hole 34 which is parallel to the horizontal longitudinal axis of the trailer 11.

When the lift cylinder 26 on either side of the trailer 11 is swiveled about its pivot pin 24, the path of the center of its latch pin hole 34 is both coradial and concentric with the circular arc on which are positioned the first 37, second 38, and third latch pin hole 39 on that side of the bulkhead 17. On either side of the trailer 11, a headed right circular cylindrical latch pin 36 which is a close fit to both the latch pin hole 34 of the latch plate 33 of the latching sleeve 32 and to any of the latch pin holes 37, 38, 39 in the bulkhead 17 is used to lock the lift cylinder on that side in a fixed orientation. With the latch pin 36 engaged in the second latch pin hole 38 in the bulkhead which is in the middle of the set of latch pin holes 37, 38, and 39, the lift cylinder 26 is positioned parallel to the vertical midplane of the trailer 11.

Threadedly attached to the lower end of the rod 29 of each lift cylinder 26 is a rod end fitting 45. The rod end fitting 45 has a right circular cylindrical shank portion with a coaxial tapped hole in its upper end, a reduced diameter neck at the lower side of the shank portion, and a spherical ball end 46 coaxially located on the bottom end of the neck. A pair of diametrically opposed radially extending short right circular cylindrical tie bar pins 47 extend from the shank portion of each rod end fitting 45 at approximately midheight of the shank. The tie bar pins 47 of the rod end 45 are oriented so that they are parallel to the horizontal longitudinal axis of the trailer 11. The rotational axes created by the tie bar pins 47 intersect the longitudinal axes of their respective lift cylinders 26.

Mounted to the ball end 46 of each rod end 45 is a bearing foot 50. The bearing foot 50 is a rectangular plate structure having a flat central portion and with a short length of the outer portion of two opposed sides bent slightly upwardly. Centrally located on the upper surface of the bearing foot 50 is an upwardly projecting ball socket 51 which has a spherical internal cup which engages and has a slip fit with the ball end 46 of the rod end 45. The exterior of the ball socket 51 is a short right circular cylindrical section. While the bearing feet 50 are able to freely swivel about the ball end 46 of the rod end 45, the bearing feet are normally oriented so that the planes of symmetry extending through both bent sections of the feet are in the transverse plane of the trailer 11. This orientation more readily permits the bearing feet 50 to conform to a soft or irregular ground surface 13.

As best seen in FIGS. 1 and 3, a tie bar 60 consists of an elongated tubular midbody supporting two antisymmetrically mounted tie bar devises 61 at its outer ends. A pair of coaxial right circular cylindrical clevis pin holes 62 which are engagable with the tie bar pins 47 of the rod ends 45 penetrate the jaw plates of each tie bar clevis 61. The distance between the pairs of clevis pin holes 62 is equal to the distance between the pairs of swivel pin holes 23 of the lift cylinder brackets 22. The tie bar pins 47 and the tie bar clevis pin holes 62 have a rotational slip fit. The clevis pin holes 62 at each end of the tie bar 60 are connected to the tie bar pins 47 of the rod ends 45 of the lift cylinders 26.

The lateral shifting assembly 21 constitutes a four-bar linkage lying in the transverse plane at the rear of the trailer 11. The links of the four-bar linkage are the tie bar 60, the lift cylinders 26 with their rods and rod ends, and the transverse rear bulkhead 17 of the trailer. The pins of the linkage are the main cylinder pivot pins 24 and the tie bar pins 47 of the rod ends 45 of the cylinders 26. For this first embodiment, the opposed sides of the four-bar linkage are maintained parallel.

Second Embodiment 100

Figure 7:
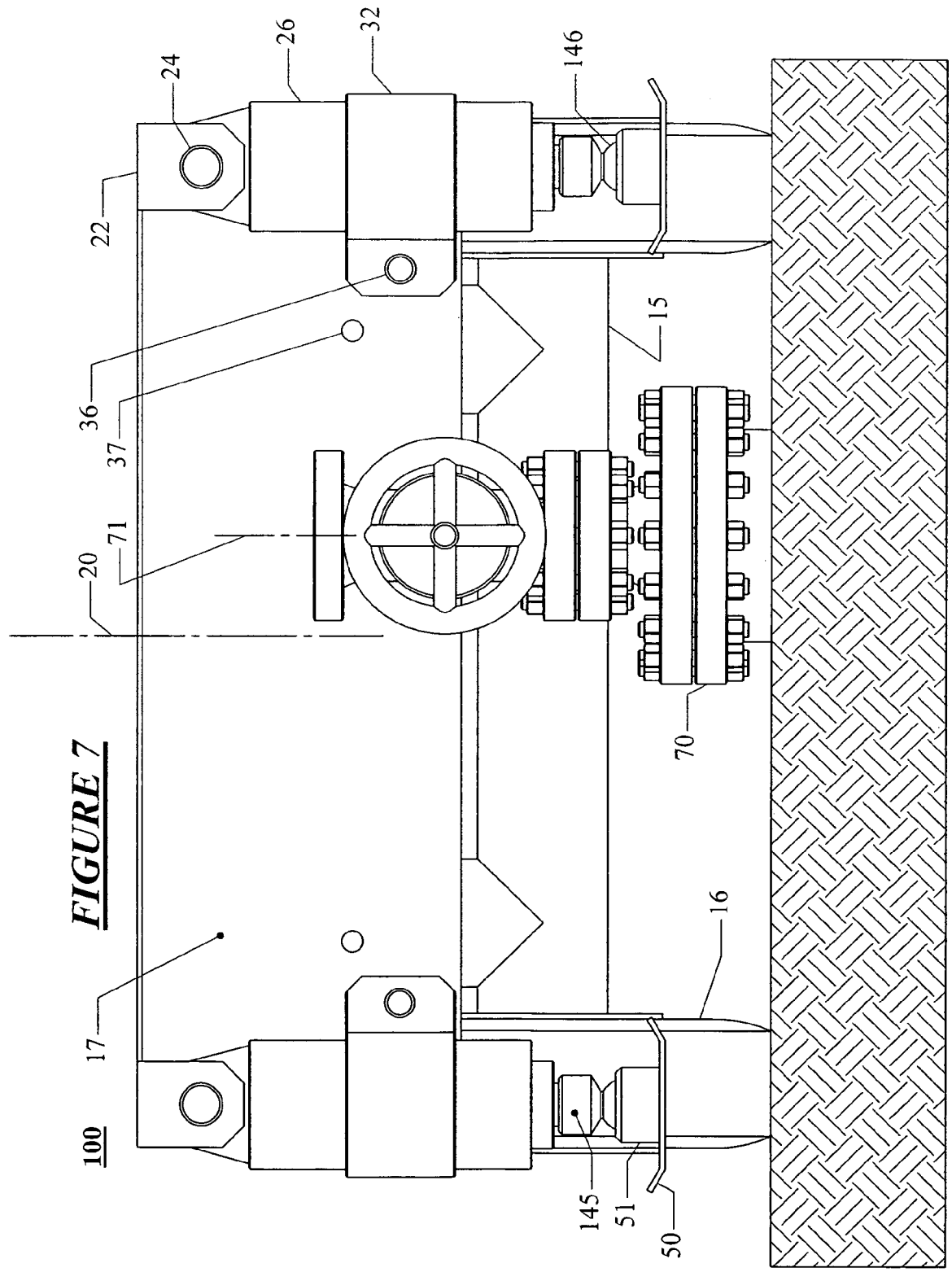
FIG. 7 is a rear profile view of the vehicle and the second embodiment of the lateral shifting means, wherein the shifting means is retracted in its traveling position and the rear of the vehicle is laterally placed from a wellhead upon which work is to be performed using the vehicle-mounted equipment.
Figure 8:
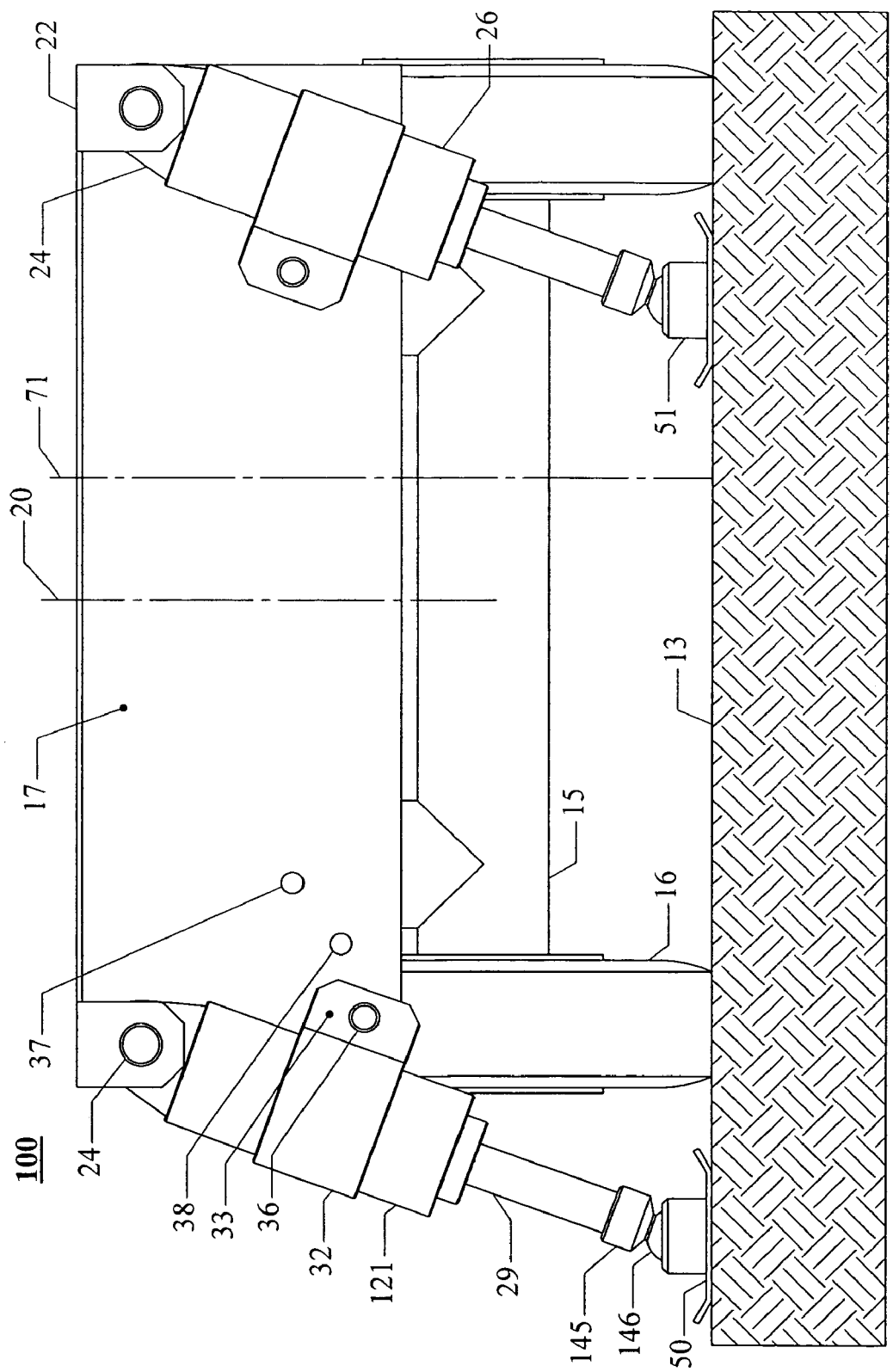
FIG. 8 is a view corresponding to FIG. 7, wherein the cylinders of the lateral shifting means are pinned in an inclined position to urge the rear end of the vehicle laterally toward the wellhead.
Figure 9:
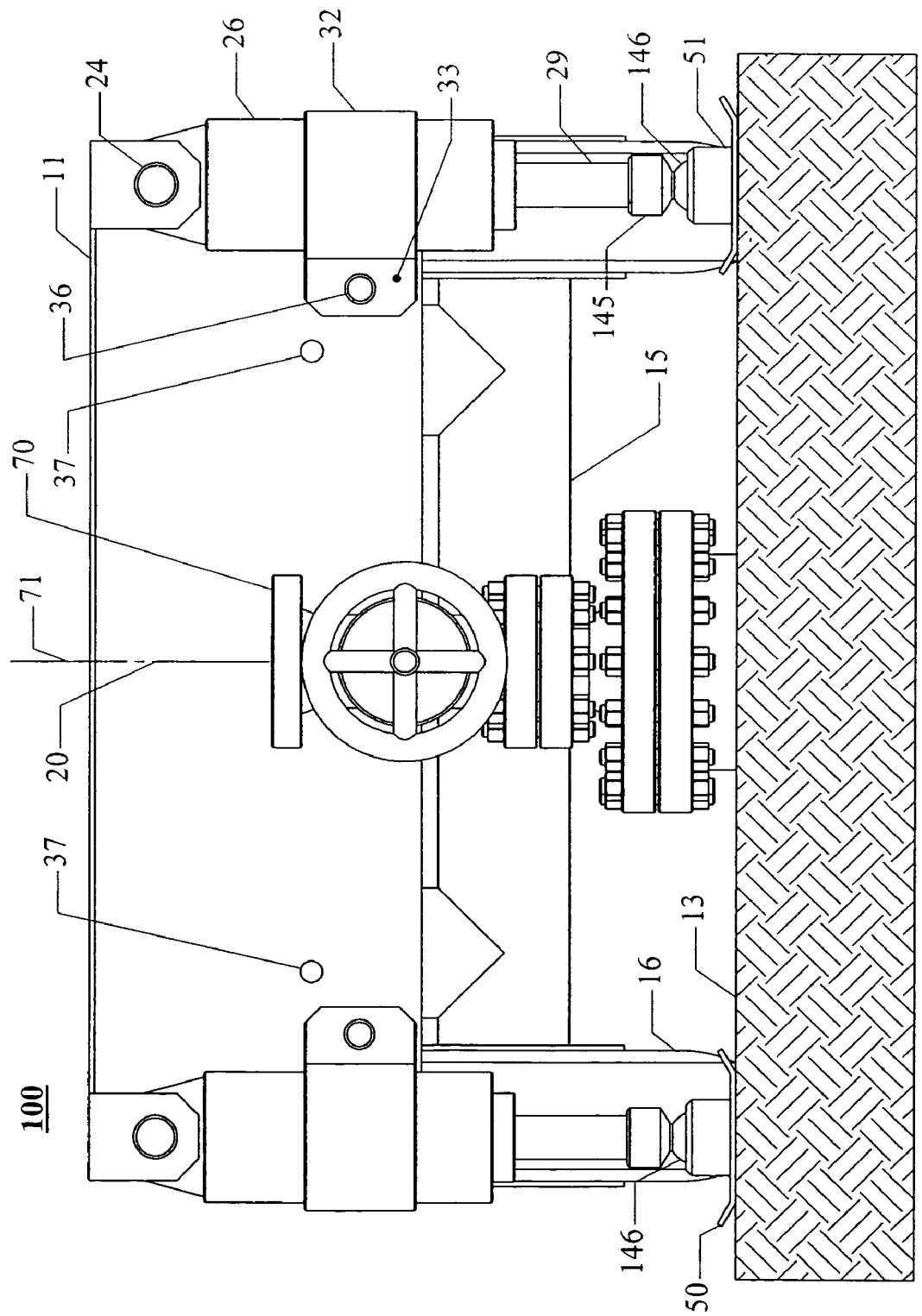
FIG. 9 is a view corresponding to FIGS. 7 and 8, wherein the rear end of the vehicle has been shifted laterally to be in transverse alignment with the wellhead and the lateral shifting means returned to an alignment with vertical cylinders extended to enhance the stability of the rear end of the vehicle.

A second embodiment 100 of the laterally shiftable vehicle is shown in FIGS. 7, 8, and 9. For clarity in illustrating the second embodiment the tractor rig 18 is not shown in FIGS. 7, 8 and 9, although it is assumed that the tractor rig 18 is attached to the trailer 11 while at the work location.

The second embodiment 100 is configured identically with the first embodiment 10, with the exception that the tie bar 60 is eliminated and the tie bar pins 47 of the rod end 145 are omitted in the lateral shifting assembly 121. Otherwise, the construction of the rod end 145 and adjoining ball end 146 is identical with that of the rod end 45 and ball end 46 of the first embodiment 10 of the present invention.

These modifications make the positioning of the lift cylinders 26 independent and the lateral shifting assembly 121 of the second embodiment is no longer a four-bar linkage. However, in operation the lift cylinders 26 are always pinned by means of their latch pins 36 and the two sets of latch pin holes 37, 38, and 39 in bulkhead 17 so that the axes of the cylinders are parallel. This arrangement is particularly suitable for an uneven ground surface 13, as it permits the rods 29 of the lift cylinders 26 to be extended unequally. For such an arrangement, the two lift cylinders 26 can be independently valved.

Third Embodiment 200

Figure 10:
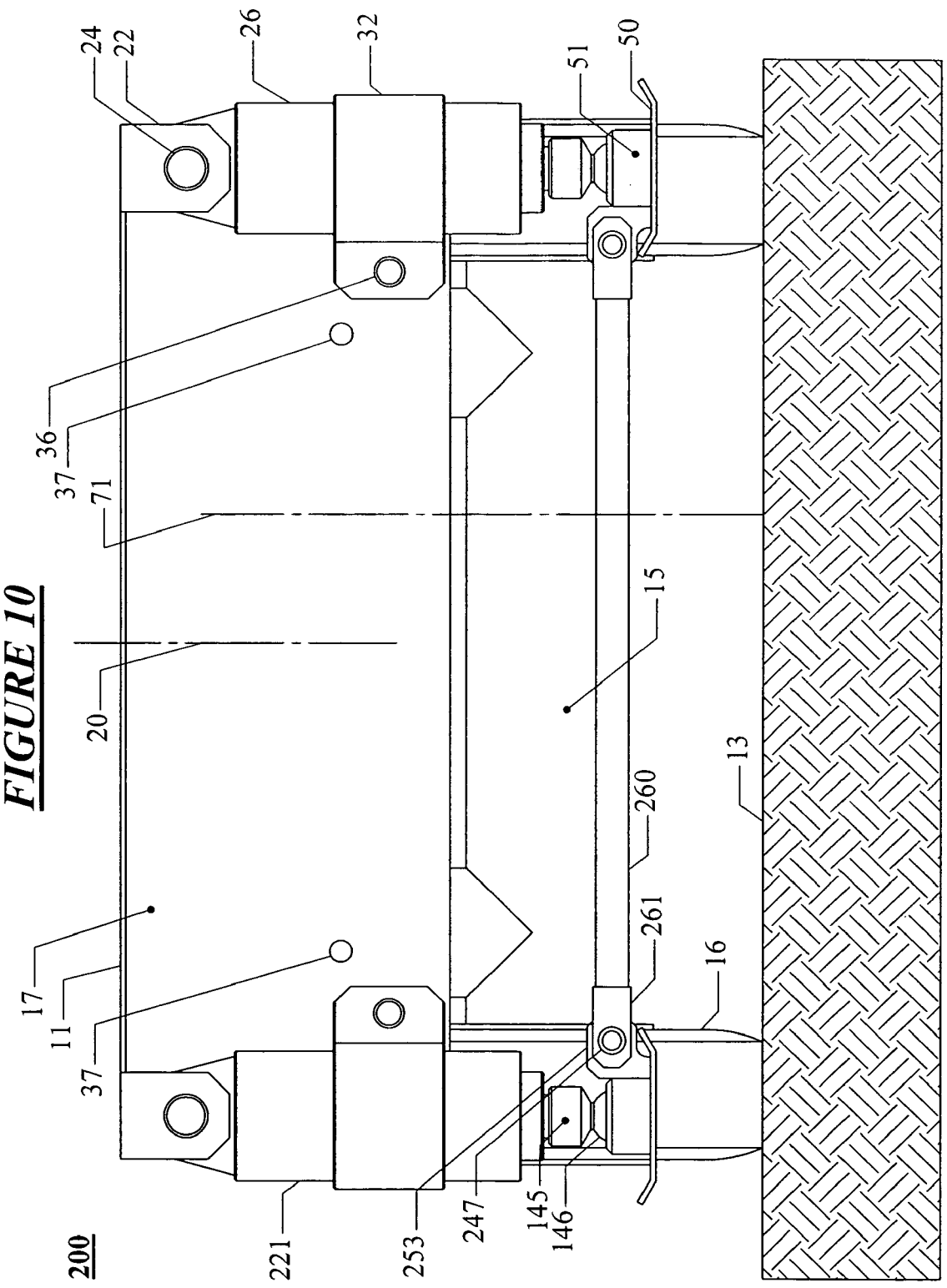
FIG. 10 is a rear profile view of the vehicle and the third embodiment of the lateral shifting means, wherein the shifting means is retracted in its traveling position and the rear of the vehicle is laterally displaced from a wellhead upon which work is to be performed using the vehicle-mounted equipment.
Figure 11:
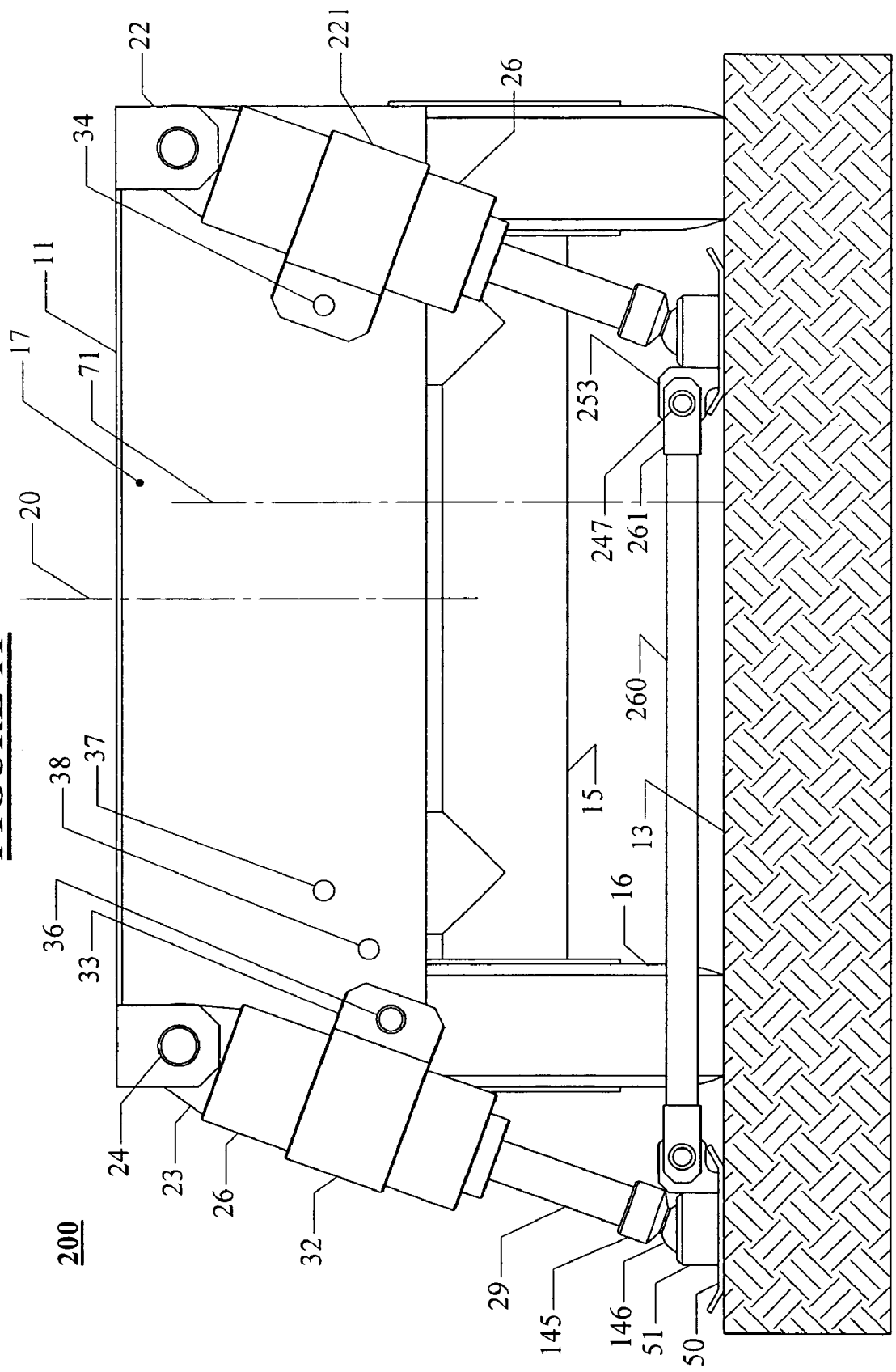
FIG. 11 is a view corresponding to FIG. 10, wherein the cylinders of the lateral shifting means are pinned in an inclined position to urge the rear end of the vehicle laterally toward the wellhead.
Figure 12:
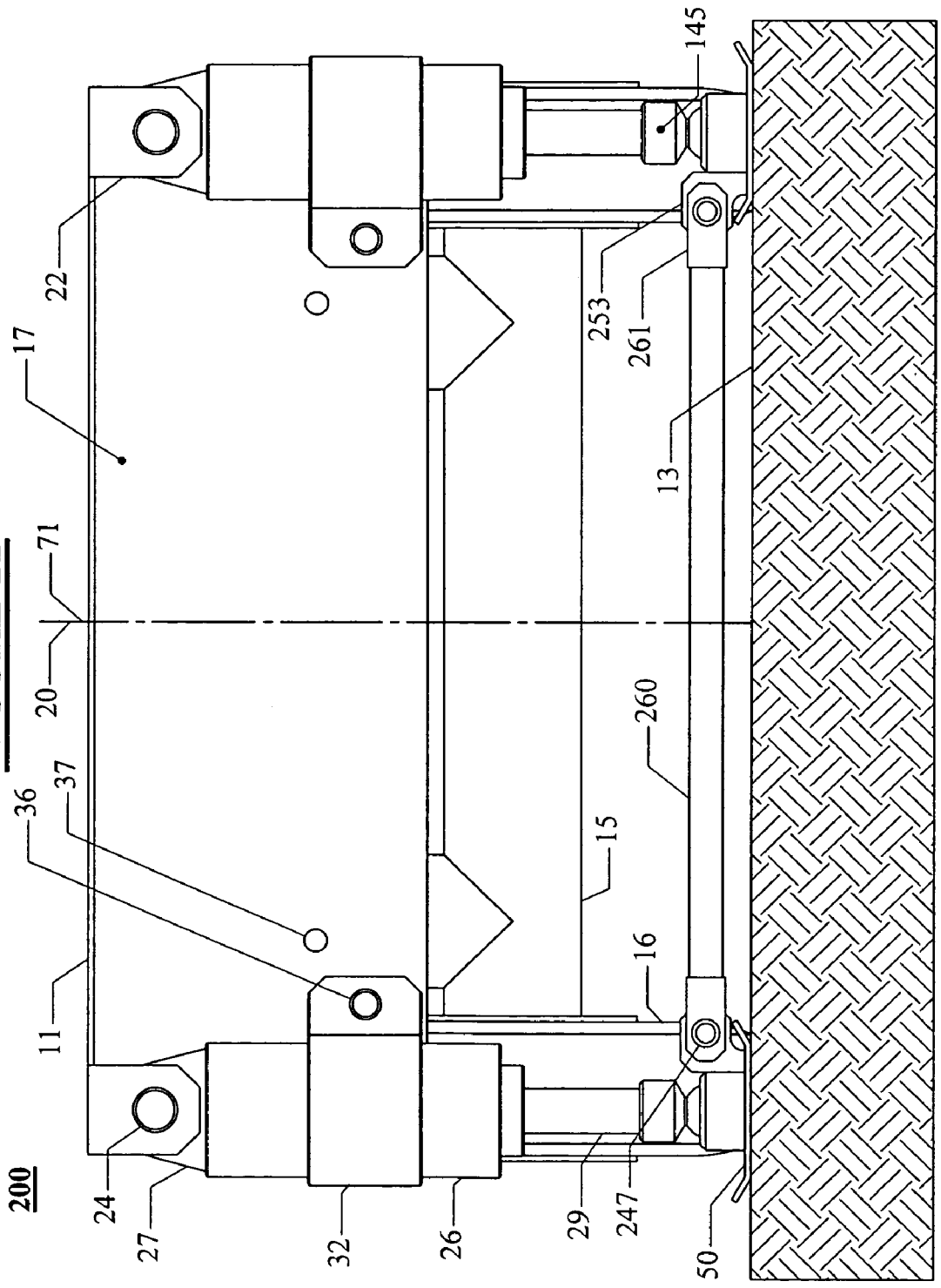
FIG. 12 is a view corresponding to FIGS. 10 and 11, wherein the rear end of the vehicle has been shifted laterally to be in transverse alignment with the wellhead and the lateral shifting means returned to an alignment with vertical cylinders extended to enhance the stability of the rear end of the vehicle.

The third embodiment 200 of the laterally shiftable vehicle is shown in FIGS. 10, 11, and 12. For clarity in illustrating the third embodiment 200, the tractor rig 18 is not shown in FIGS. 10, 11 and 12. The third embodiment 200 is very similar to the first 10 and the second 100 embodiments and uses the same trailer 11 and tractor rig 18, but the lateral shifting assembly 221 of the third embodiment 200 has the following differences in structure. The lateral shifting assembly 221 uses the same cylinder rod end 145 without an integral tie bar pin as is used for the lateral shifting assembly 121 of the second laterally shiftable vehicle embodiment 100.

Lateral shifting assembly 221 does utilize a tie bar 260 to interconnect the two sides of the lateral shifting assembly, but the tie bar is pivotably attached to each of the bearing feet 50, rather than to the rod end 45 as in the first embodiment 10. For each end of the tie bar 260, the attachment of the tie bar is to a tie bar pin plate 253 positioned on the transverse plane of the lateral shifting assembly 221 and welded on the inboard side of the each of the bearing feet 50. The tie bar pin plates 253 are penetrated by right circular cylindrical pin holes that are parallel to the horizontal longitudinal axis of the trailer 11. The tie bar 260 is structurally similar to the tie bar 60 of the first embodiment 10, but it is shorter. Additionally, the tie bar devises 261, penetrated by clevis pin holes, are narrower. The tie bar pins 247 are substantially identical to the tie bar pins 47 of the first embodiment 10. The tie bar pins 247 are engaged in both the clevis pin holes of the tie bar 260 and in the pin holes in the tie bar pin plates 253. The locations of the installed tie bar pins 247 are such that the axes of the pins are offset inwardly from the centerline of the lift cylinders 26.

OPERATION OF THE INVENTION

First Embodiment 10

The first embodiment of the laterally shiftable vehicle 10 operates in the following manner. The tractor rig 18 backs the trailer 11 up to the wellhead 70 until the transverse plane of the trailer containing the vertical axis 20 of the trailer-mounted equipment is aligned with the vertical axis 71 of the wellhead 70. For clarity, the tractor rig 18 is not shown in the Figures herein and the front end of the trailer 11 is assumed to be supported pivotably about the vertical axis 19 of the king pin 14 and the fifth wheel by the tractor rig 18. It also is assumed herein for the sake of illustration that the axis 20 of the trailer-mounted equipment will be laterally misaligned so that it is offset to the left of the wellhead, as shown in FIG. 4.

Figure 5:
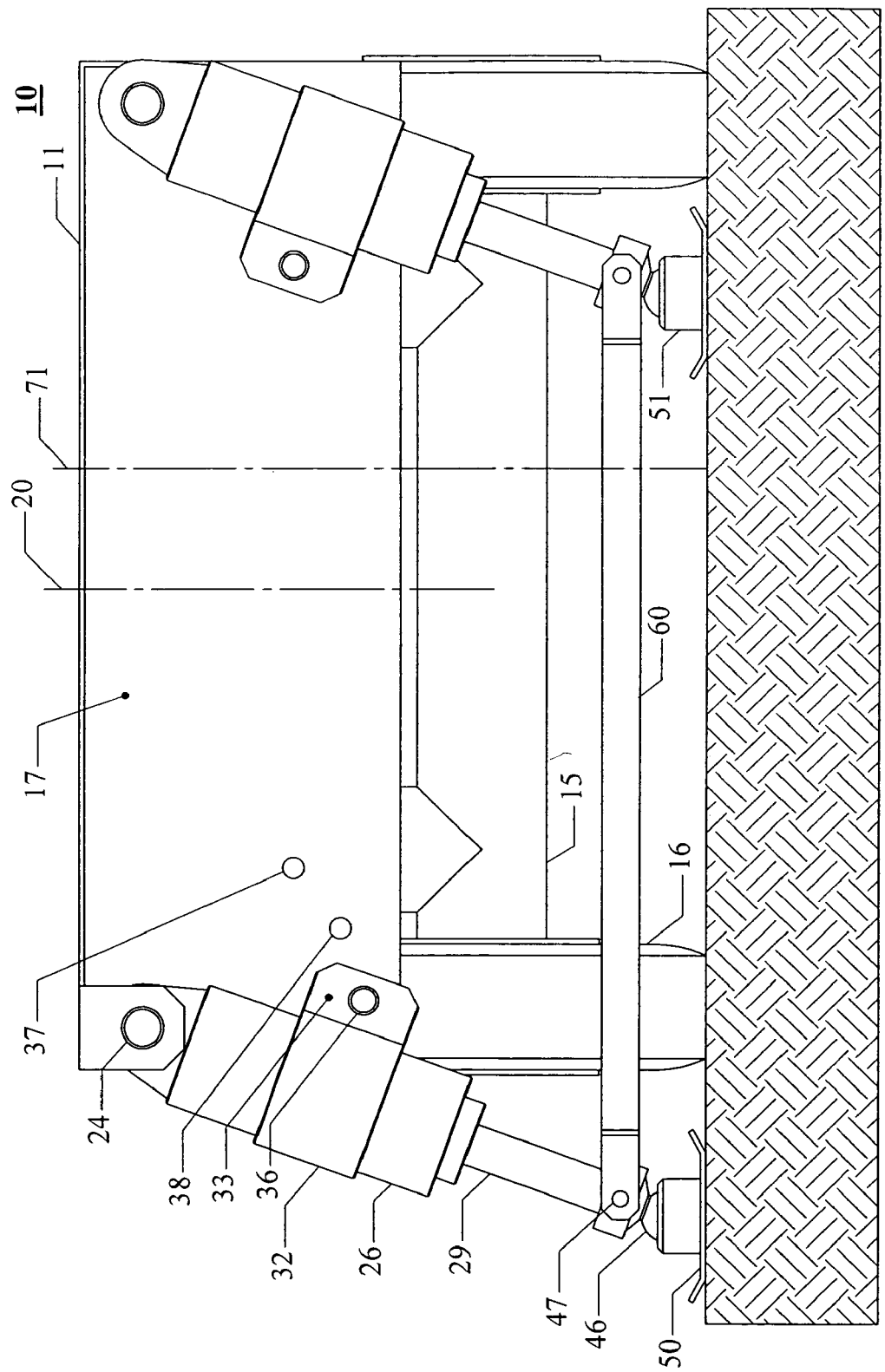
FIG. 5 is a view corresponding to FIG. 4, wherein the cylinders of the lateral shifting means are pinned in an inclined position to urge the rear end of the vehicle laterally toward the wellhead.

In order to correct this lateral misalignment, the person operating the lateral shifting mechanism 21 will manually swing the dependent portion of the four-bar linkage, consisting of the lift cylinders 26 with attachments and the tie bar 60, to the left as seen in FIG. 5. The lateral shifting mechanism 21 is locked in its leftward position by engaging the lefthand latch pin 36 both through the latch pin hole 34 of the latching sleeve 32 on the lefthand lift cylinder 26 and in the third latch pin hole 39 on the lefthand side of the transverse rear bulkhead 17 of the trailer 11. Likewise, the righthand latch pin 36 is engaged both in the righthand latch pin hole 34 of the latching sleeve 32 of the lift cylinder 26 and in the first latch pin hole 37 on the righthand side of the transverse rear bulkhead 17. This engagement of the latch pins 36 locks the cylinders 26 in a parallel, leftwardly inclined position. The tie bar 60 aids in the alignment of the final of the two pinnings of the latch pins 36, since pinning one latch pin causes the latch pin hole 34 on the other side to align with its target latch pin hole 37, 38, or 39 in the transverse rear bulkhead 17 of the trailer 11.

Following this pinning of the lift cylinders 26 in the position shown in FIG. 5, the rods 29 of the cylinders are extended to engage the ground surface 13 with the bearing feet 50. Because the lift cylinders 26 are locked in a parallel position and the tie bar 60 has a fixed length, the rods 29 of the lift cylinders must be extended substantially equally unless one of the latch pins 36 is not in pinned engagement. As the rods 29 of the lift cylinders 26 are extended beyond their initial engagement with the ground surface 13, a portion of the vertical load of the trailer weight is transferred to the cylinders from the tires 16 and suspensions of the rear axles 15 of the trailer 11.

This load transfer partially unloads the suspension of the trailer 11, so that the suspension extends and the tires 16 still contact the ground surface 13. Simultaneously, the lift cylinders 26 are exerting a rightward lateral load on the trailer 11. This rightward load causes the rear end of the trailer 11 to displace rightwardly, with the tires 16 dragging across the ground surface. At the same time, the forward end of the trailer 11 is restrained against lateral movement by the tractor rig 18, so that the trailer 11 pivots about the vertical axis 19 of the king pin 14 and the fifth wheel of the tractor rig. During this time, the presence of the tie bar 60 aids in stabilizing the ends of the piston rods 29 in the event of lateral slippage of one of the bearing feet 50. This stabilization is produced by lateral load sharing through the tie bar.

By metering the extension of the rods 29 of the lift cylinders 26 by means of the hydraulic controls (not shown) for the cylinders, the rightward travel of the rear end of the trailer 11 can be selectably controlled. When the desired orientation of the vertical axis 20 of the trailer mounted equipment with the vertical axis 71 of the wellhead 70 is achieved, the hydraulic pressure on the piston ends of the lift cylinders 26 is vented, causing the lift cylinders to support only minor loads attendant with hydraulic flow losses between the piston end of the cylinders and the hydraulic tank. The rods 29 of the single-acting spring-return lift cylinders 26 are returned to their retracted positions when extension pressure is removed by the reaction of the bearing feet 50 with the ground surface and the return springs. As a result, the weight of the trailer 11 supported by the lift cylinders 26 is transferred back fully to the tires 16 and the suspension of the rear axles 15 of the trailer and the trailer is lowered with its rear end substantially in alignment with the wellhead 70. The frictional resistance of the tires 16 to lateral movement aids in preventing the return of the rear end of the trailer 11 to its original position during this lowering.

In the event that the residual piston end pressure during retraction of the lift cylinders 26 causes a nontrivial leftward lateral load component to be applied to the trailer 11 while it is being lowered, some minor rebound to the left of the trailer will occur. Experienced operators of the lateral shifting assembly 21 can compensate for this hysteresis rebound by providing selectably determined overtravel to the right during the extension of the piston rods 29. In the event to shifting the trailer 11 too far to the right during the lifting operation, the four-bar linkage can be unpinned and then repinned in a rightwardly inclined position for repositioning leftwardly.

Figure 6:
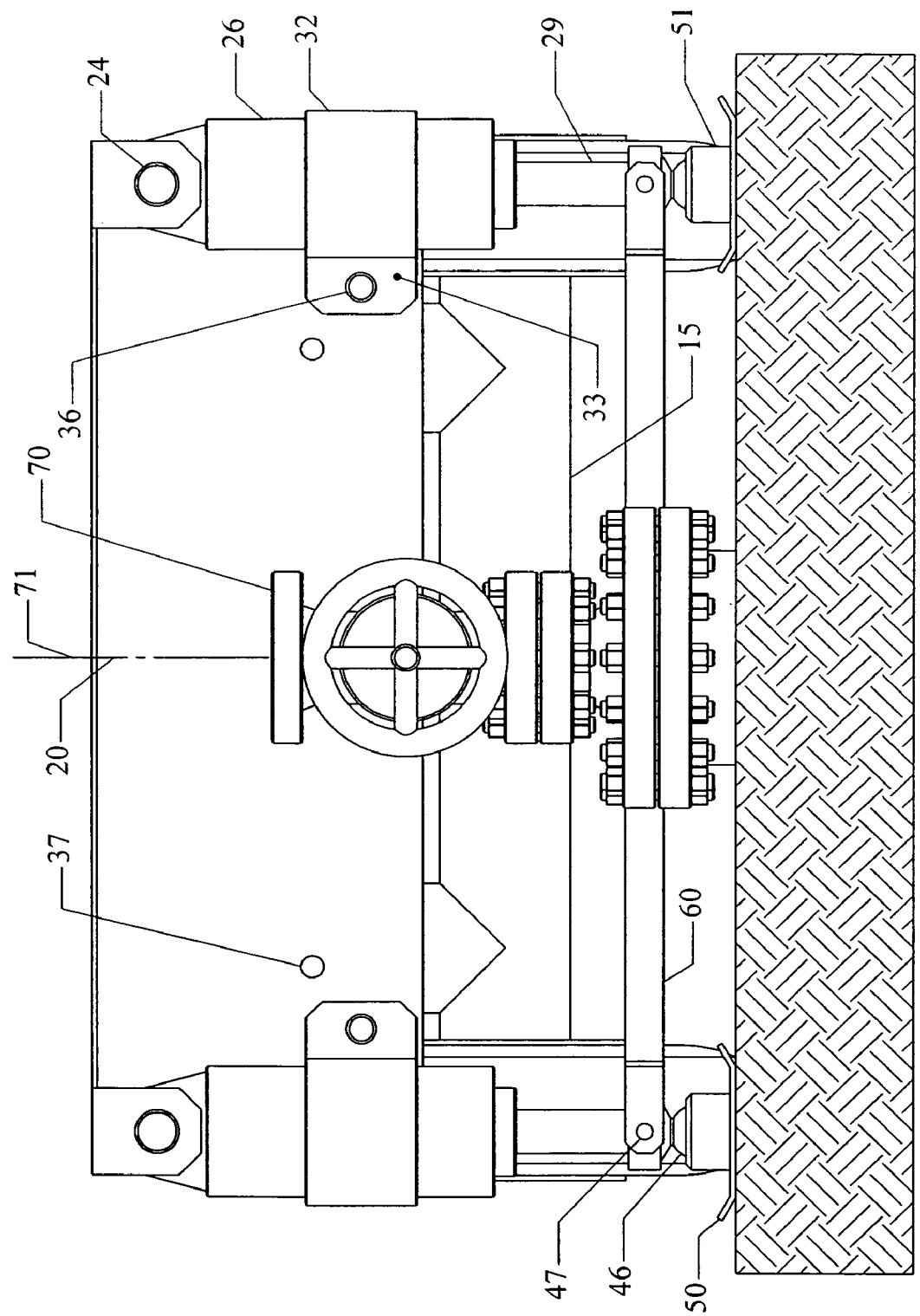
FIG. 6 is a view corresponding to FIGS. 4 and 5, wherein the rear end of the vehicle has been shifted laterally to be in transverse alignment with the wellhead and the lateral shifting means returned to an alignment with vertical cylinders extended to enhance the stability of the rear end of the vehicle.

When the desired transverse alignment of the vertical axis 20 of the trailer-counted equipment and the vertical axis 71 of the wellhead 70 is obtained, the latch pins 36 are withdrawn and repinned in the second latch pin holes 38 on both sides of the bulkhead 17. The lift cylinders 26 can then have their rods 29 extended so that the trailer 11 is leveled and stabilized as shown in FIG. 6 by transferring load from the tires 16 and suspension of the rear axles 15 to the cylinders and their attached bearing feet 50. In the event that the ground is uneven, it is possible to disengage one of the latch pins 36 so that the rods 29 of the lift cylinders 26 can be extended unequally. When work is completed, then pressure is vented from the piston end of the lift cylinders 26 and the rods 29 are fully retracted to their traveling positions shown in FIG. 4 by the action of the return springs.

It should be noted that, if the lift cylinders 26 are to be extended by different amounts, side loads could be induced on the rods 29 and damage could result. For this reason, one of the latch pins 26 should not be engaged in such an instance. An alternative measure to avoid unequal extension of the rods 29 would be to use a hydraulic flow divider to ensure that both lift cylinders 26 receive the same flow during extension and hence will extend equally.

Second Embodiment 100

The operation of the lateral shifting assembly 121 of the second embodiment 100 of the laterally shiftable vehicle is very similar to that of the first embodiment 10. For the second embodiment, 100, the lack of a tie bar means that the operator must individually incline and pin the lift cylinders 26. The lift cylinders 26 are always placed in parallel positions and pinned using their respective latch pins 36 before cylinder extension and lifting are initiated. The lack of a tie bar eliminates the need for matching the extensions of the rods 29 for the pair of lift cylinders 26 for the second embodiment 100. Otherwise, the basic operations of the first 10 and second 100 embodiments are identical.

Third Embodiment 200

The operation of the lateral shifting assembly 221 of the third embodiment 200 of the laterally shiftable vehicle is very similar to that of the first two embodiments 10 and 100. As shown in FIGS. 10, 11, and 12, it may be seen that the tiebar 260 is parallel to the deck of the trailer 11 and the lift cylinders 26 are mutually parallel when the lift cylinders are in any position, as long as the cylinder rod 29 extensions are equal and the bearing plates 50 are also parallel to the trailer deck. When this is not the case, then the lift cylinders 26 are no longer parallel. For this reason, one of the latch pins 36 is not inserted whenever the lift cylinders 26 are extended in order to avoid side loads on the rods 29 or other overstress conditions.

ADVANTAGES OF THE INVENTION

The present invention permits achieving proper lateral alignment of a vehicle such as a truck or tractor/trailer with a fixed axis by a much simpler method than previously available. Repeatedly backing up, inspecting alignment, and pulling forward to permit backing up again to correct the alignment is very time consuming, particularly on uneven ground. The present invention is operable by one operator and requires only converting the mounting of the leveling lift cylinders normally on the rear of a working vehicle to a pivotable mounting, the provision of latch pins and receptacles, and a tie bar if desired. The lateral shifting assemblies of the present invention are safe to use, only marginally heavier than conventional corner lift cylinders, and inexpensive. Because the present invention can achieve lateral alignment much faster than conventional methods, it permits much quicker setups at work locations with attendant cost savings.

Various details of the present invention may be modified without departing from the spirit of the invention. For instance, double acting hydraulic cylinders could be used, latch pin positions moved, the geometry of the latching sleeve varied, and the location of the tie bar pins could be moved in the event that a tie bar is used. Likewise, a conventional truck could replace the trailer/tractor rig combination. In such a case, the vertical axis of rotation for the movement of the vehicle would be a vertical axis centrally located between the front wheels of the truck. However, these and other modifications do not alter the basic spirit of the invention.

What is claimed is:

1. A vehicular lateral shifting assembly having a pair of selectably extensible hydraulic cylinders mounted on opposed sides of one end of a body of a vehicle, wherein the cylinders are pivotable in a plane transverse to a longitudinal axis of the vehicle, and wherein the cylinders are coupled such that when the cylinders are pivoted a first end of each of the two cylinders are laterally displaced in the same direction.

2. The vehicular lateral shifting assembly of claim 1, further comprising a selectably operable latching means for latching the pivotable cylinders in place.

3. The vehicular lateral shifting assembly of claim 1, wherein the first end of the cylinders are supported by a vehicle-mounted clevis mount.

4. The vehicular lateral shifting assembly of claim 1, wherein each cylinder has a swivelable bearing plate mounted on a second end of the cylinder.

5. The vehicular lateral shifting assembly of claim 1, wherein the pair of hydraulic cylinders are coupled with a tie bar.

6. The vehicular lateral shifting assembly of claim 5, wherein the vehicular lateral shifting assembly is a four-bar linkage including the one end of the body of the vehicle, the pair of hydraulic cylinders and the tie bar, wherein the cylinders are on opposed sides of the four-bar linkage.

7. The vehicular lateral shifting assembly of claim 6, wherein the hydraulic cylinders remain parallel to each other.

8. A vehicular lateral shifting assembly comprising:
   a pair of selectably extensible hydraulic cylinders, wherein one cylinder is mounted on a first side of one end of a body of a vehicle and the other cylinder is mounted on a second opposed side of the one end of the body;
   a coupling means for coupling the cylinders;
   a mounting means for mounting a proximal end of each cylinder to the one end of the body;
   a pivotable means for pivoting the coupled cylinders about the mounting means in a plane transverse to a longitudinal axis of the vehicle, wherein when the cylinders are pivoted a first end of each of the two cylinders is laterally displaced in the same direction;
   a latching means for securing the cylinders in a designated position in the plane transverse to the longitudinal axis of the vehicle, wherein the cylinders are substantially parallel to each other when secured by the latching means; and
   a swivelable bearing plate mounted on a distal end of each cylinder.

9. The vehicular lateral shifting assembly of claim 8, wherein the mounting means is a clevis mount.

10. The vehicular lateral shifting assembly of claim 8, wherein the latching means is selectably operable.

11. The vehicular lateral shifting assembly of claim 8, wherein the cylinders are cojoined by a tie bar.

12. The vehicular lateral shifting assembly of claim 8 having a plurality of designated positions for securing the cylinders with the latching means.

13. The vehicular lateral shifting assembly of claim 8, wherein the hydraulic cylinders remain parallel to each other.

14. A vehicular lateral shifting assembly comprising:
   a pair of selectably extensible hydraulic cylinders, wherein one cylinder is mounted on a first side of one end of a body of a vehicle and the other cylinder is mounted on a second opposed side of the one end of the body;
   a clevis mount for pivotably mounting a proximal end of each cylinder to the one end of the body, wherein the cylinders are pivotable in a plane transverse to a longitudinal axis of the body;
   a joiner pivotably coupling the cylinders, wherein pivoting one cylinder will pivot the other cylinder;
   a latching mechanism for securing each cylinder in one of a number of designated positions in the plane transverse to the longitudinal axis of the vehicle; and
   a swivelable bearing plate mounted on a distal end of each cylinder.

15. The vehicular lateral shifting assembly of claim 14, wherein the joiner is a tie bar forming a four-bar linkage with the cylinders on opposed sides of the four-bar linkage.

16. The vehicular lateral shifting assembly of claim 14, wherein the vehicular lateral shifting assembly is a four-bar linkage including the one end of the body of the vehicle the pair of hydraulic cylinders and the joiner, wherein the cylinders are on opposed sides of the four-bar linkage.

17. A vehicular lateral shifting assembly comprising a four-bar linkage mounted on one end of a body of a vehicle, the four-bar linkage having a pair of selectably extensible parallel hydraulic cylinders and two interconnecting links, wherein the cylinders are on opposed sides of the four-bar linkage and the cylinders are laterally pivotable in a plane transverse to a longitudinal axis of the body of the vehicle.

18. A method for laterally shifting an end of a stationary vehicle having the vehicular lateral shifting assembly of claim 14, the method comprising the steps of:
   (a) selectably tilting a distal end of the hydraulic cylinders in an opposed direction to the direction in which lateral displacement of the vehicle is desired;
   (b) activating the latching mechanism to secure each tilted hydraulic cylinder into one of the designated positions; and
   (c) extending the hydraulic cylinders to urge the bearing plates against a supporting surface thereby laterally displacing the one end of the vehicular body in the desired direction.

19. The method of claim 18 further comprising the steps of:
   (e) retracting the hydraulic cylinders to release the bearing plates from the supporting surface;
   (f) releasing the latching mechanism;
   (g) repositioning the hydraulic cylinders to a more vertical position; and
   (h) extending the hydraulic cylinders to urge the bearing plates against the supporting surface thereby releasing lateral frictional forces on the tires of the vehicle.

20. A vehicular lateral shifting assembly comprising:
   a pair of parallel selectably extensible hydraulic cylinders, wherein one cylinder is pivotably mounted on a first side of one end of a body of a vehicle and the other cylinder is pivotably mounted on a second opposed side of the one end of the body;
   a mounting structure for pivotably mounting a proximal end of each cylinder to the one end of the body, wherein the cylinders remain substantially parallel to each other as the cylinders are pivoted in a plane transverse to a longitudinal axis of the body;
   a coupling mechanism for pivotably coupling the pair of cylinders, wherein when one cylinder is pivoted the other cylinder is pivoted in the same direction;
   a four-bar linkage including the coupling mechanism on one side, the two parallel cylinders on a second and third opposed sides, and the one end of the body on a fourth side; and
   a swivelable bearing plate mounted on a distal end of each cylinder.

* * * * *